(12) United States Patent
Jonsson et al.

(10) Patent No.: US 12,254,767 B2
(45) Date of Patent: Mar. 18, 2025

(54) OPERATIONAL DESIGN DOMAIN VALIDATION COVERAGE FOR ADJACENT LANE RELATIVE VELOCITY

(71) Applicant: Zenuity AB, Gothenburg (SE)

(72) Inventors: Jonathan Jonsson, Gothenburg (SE); Mathias Westlund, Lerum (SE)

(73) Assignee: Zenuity AB, Gothenburg (SE)

( * ) Notice: Subject to any disclaimer, the term of this patent is extended or adjusted under 35 U.S.C. 154(b) by 69 days.

(21) Appl. No.: 16/950,450

(22) Filed: Nov. 17, 2020

(65) Prior Publication Data
US 2021/0150897 A1 May 20, 2021

(30) Foreign Application Priority Data
Nov. 18, 2019 (EP) .................................... 19209642

(51) Int. Cl.
*G08G 1/052* (2006.01)
*B60W 60/00* (2020.01)
(Continued)

(52) U.S. Cl.
CPC ......... *G08G 1/052* (2013.01); *B60W 60/0016* (2020.02); *G08G 1/0112* (2013.01);
(Continued)

(58) Field of Classification Search
CPC ...... G08G 1/052; G08G 1/0112; G08G 1/015; G08G 1/048; G08G 1/0115;
(Continued)

(56) References Cited

U.S. PATENT DOCUMENTS

| | | | |
|---|---|---|---|
| 10,565,873 B1* | 2/2020 | Christensen | G08G 1/0965 |
| 2011/0130936 A1* | 6/2011 | Noda | G08G 1/167 |
| | | | 701/70 |

(Continued)

FOREIGN PATENT DOCUMENTS

| | | |
|---|---|---|
| CN | 105593640 A | 5/2016 |
| CN | 110276985 A | 9/2019 |

(Continued)

OTHER PUBLICATIONS

Extended European Search Report mailed May 14, 2020 for European Patent Application No. 19209642.8, 6 pages.
(Continued)

*Primary Examiner* — Krishnan Ramesh
(74) *Attorney, Agent, or Firm* — Sage Patent Group

(57) ABSTRACT

A control system for an ego-vehicle traveling in a first direction in a first lane on a road segment where the vehicle has a driver support function for autonomously maneuvering the vehicle. The control system includes control circuitry configured to obtain sensor data including information about a surrounding environment of the vehicle. The control circuitry determines a relative velocity of at least one external vehicle traveling in a second lane adjacent to the first lane based on the obtained sensor data. Moreover, the control circuitry is configured to generate a control signal in to control an availability of the driver support function for the road segment based on the comparison in order to make the driver support function available for an occupant of the vehicle if at least one external vehicle of the external vehicle(s) has been confirmed to have a relative velocity below the maximum velocity threshold.

15 Claims, 5 Drawing Sheets

(51) Int. Cl.
  *G08G 1/01*     (2006.01)
  *G08G 1/015*    (2006.01)
  *G08G 1/048*    (2006.01)

(52) U.S. Cl.
  CPC ............ *G08G 1/015* (2013.01); *G08G 1/048* (2013.01); *B60W 60/0053* (2020.02); *B60W 2554/80* (2020.02)

(58) Field of Classification Search
  CPC ......... B60W 60/0016; B60W 60/0053; B60W 2554/80; B60W 2520/10; B60W 2554/804; B60W 30/18018; B60W 60/00; B60W 40/105; B60Y 2300/18016
  USPC .......................................................... 701/23
  See application file for complete search history.

(56) References Cited

U.S. PATENT DOCUMENTS

| | | | | |
|---|---|---|---|---|
| 2012/0101711 | A1* | 4/2012 | Furmston | G01S 13/931 701/300 |
| 2015/0183430 | A1* | 7/2015 | Schwindt | B60W 30/09 701/23 |
| 2016/0272201 | A1* | 9/2016 | Kang | G08G 1/096741 |
| 2016/0318511 | A1* | 11/2016 | Rangwala | G08G 1/162 |
| 2017/0242435 | A1* | 8/2017 | Nilsson | G08G 1/167 |
| 2018/0011497 | A1 | 1/2018 | Schroeder et al. | |
| 2018/0025645 | A1* | 1/2018 | Schwindt | G08G 1/166 701/301 |
| 2018/0134295 | A1 | 5/2018 | Gaither | |
| 2019/0088135 | A1* | 3/2019 | Do | B60W 50/14 |
| 2019/0291728 | A1* | 9/2019 | Shalev-Shwartz | B60W 30/165 |
| 2019/0385458 | A1* | 12/2019 | Garrett | G08G 1/166 |
| 2022/0144278 | A1* | 5/2022 | Hiramatsu | B60W 30/18054 |

FOREIGN PATENT DOCUMENTS

| | | |
|---|---|---|
| DE | 19821163 A1 | 11/1999 |
| DE | 102014215276 A1 | 2/2016 |
| WO | 2015032508 A1 | 3/2015 |
| WO | 2019094843 A1 | 5/2019 |

OTHER PUBLICATIONS

Office Action mailed Dec. 31, 2024 for Chinese Patent Application No. 202011292349.9, 8 pages.

* cited by examiner

OPERATIONAL DESIGN DOMAIN VALIDATION COVERAGE FOR ADJACENT LANE RELATIVE VELOCITY

CROSS-REFERENCE TO RELATED APPLICATIONS

The present application for patent claims priority to European Patent Office Application Ser. No. 19209642.8, entitled "OPERATIONAL DESIGN DOMAIN VALIDATION COVERAGE FOR ADJACENT LANE RELATIVE VELOCITY" filed on Nov. 18, 2019, assigned to the assignee hereof, and expressly incorporated herein by reference.

TECHNICAL FIELD OF THE INVENTION

The present disclosure relates to autonomous driving (AD) and advanced driver-assistance systems (ADAS) for vehicles such as cars, buses, trucks and the like.

BACKGROUND

Autonomous systems (AS) have the ability to act independently of direct human control and in unrehearsed conditions. These systems enables a whole range of applications, such as self-driving cars, humanoid robots and post-delivering drones. However, this increased capability and flexibility comes with a price: The difficulty in assessing reliability and safety of autonomous systems.

Traditional testing methods fall short of providing the desired standard levels, mainly due to the combinatorial explosion of possible situations to be analysed. There are strict requirements to ensure that AS are safe and reliable. The safety standards enforces the AS to operate without harmful states and the reliability requirement enforces the system to deliver services as specified. These requirements are generally associated with a low threshold of system failures, i.e. high probability of failure-free operation in a specified environment, which in turn require costly and time-consuming validation and verification of the AS.

Accordingly, the strict safety requirements that are imposed on autonomous driving (AD) systems translate into enormous validation requirements. Moreover, these strict safety requirements are put not only on the software components, but also on the decision and control components as well as the perception system of the vehicle (e.g. for accurately determining a position of the vehicle in the lane). High safety requirements on the perception system implies significant redundancy and expensive sensors and/or HD map functions.

Thus, there is need for new and improved methods and systems which mitigate the problems of presently known solutions, and in particular which for methods and system that enable for a transition from ADAS to AD in a less complex and more cost effective manner, than presently known solutions, while still fulfilling associated safety requirements.

SUMMARY OF THE INVENTION

It is therefore an object of the present disclosure to provide a control system, a vehicle comprising such a control system, a method, and a computer-readable storage medium, which alleviate all or at least some of the drawbacks of presently known solutions.

More specifically, it is an object of the present disclosure to alleviate problems related to automated driving systems in terms of immense verification requirements and high hardware costs.

This object is achieved by means of a control system, a vehicle comprising such a control system, a method, and a computer-readable storage medium, as defined in the appended claims. The term exemplary is in the present context to be understood as serving as an instance, example or illustration.

According to a first aspect of the present disclosure, there is provided a control system for an ego-vehicle traveling in a first direction in a first lane on a road segment, wherein the vehicle has a driver support function for autonomously manoeuvring the vehicle. The control system comprises control circuitry configured to obtain sensor data comprising information about a surrounding environment of the vehicle. The control circuitry is further configured to determine a relative velocity, with respect to the ego-vehicle, of at least one external vehicle traveling in a second lane adjacent to the first lane based on the obtained sensor data, and compare the determined relative velocity to a maximum velocity threshold. Moreover, the control circuitry is configured to generate a control signal in order to control an availability of the driver support function for the road segment based on the comparison in order to make the driver support function available for an occupant of the vehicle if:

at least one external vehicle of the external vehicle(s) has been confirmed to have a relative velocity below the maximum velocity threshold during a first time period; and no external vehicle of the external vehicle(s) has been confirmed to have a relative velocity above the maximum velocity threshold during a second time period.

By means of the above presented control system, the strict integrity requirements can be moved to the monitoring part of the vehicle's systems and thereby alleviate the requirements on other features of the driver support function, such as keep vehicle in lane features, which require significant amount of resources to verify and are associated with high-end, very costly, sensor equipment.

In more detail, the proposed control system enables for a system design where the integrity/reliability requirements are distributed in such a way that a driver support function in the form of a traffic jam pilot or highway pilot can be realized in a more cost effective way than previously known. More specifically, the integrity requirements on the driver support function's ability to stay in lane can be relaxed due to the reduced exposure to high relative velocities is reduced.

According to a second aspect of the present disclosure, there is provided vehicle comprising a velocity-determining device for monitoring a velocity of the vehicle, a perception system comprising at least one sensor for monitoring a surrounding environment of the vehicle, and a control system according to any one of the embodiments disclosed herein. With this aspect of the disclosure, similar advantages and preferred features are present as in the previously discussed first aspect of the disclosure.

According to a third aspect of the present disclosure, there is provided a method for controlling a driver support function for autonomously manoeuvring a vehicle traveling in a first direction on a road segment. The method comprises obtaining sensor data comprising information about a surrounding environment of the vehicle and determining a relative velocity, with respect to the ego-vehicle, of at least one external vehicle traveling in a second lane adjacent to the first lane based on the obtained sensor data. Further, the method comprises comparing the monitored relative velocity with a maximum velocity threshold, and controlling an availability of the driver support function for the road segment based on the comparison in order to make the driver support function available for an occupant of the vehicle if:

at least one external vehicle of the external vehicle(s) has been confirmed to have a relative velocity below the maximum velocity threshold during a first time period; and no external vehicle of the external vehicle(s) has been confirmed to have a relative velocity above the maximum velocity threshold during a second time period.

With this aspect of the disclosure, similar advantages and preferred features are present as in the previously discussed first aspect of the disclosure.

According to a fourth aspect, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1A:
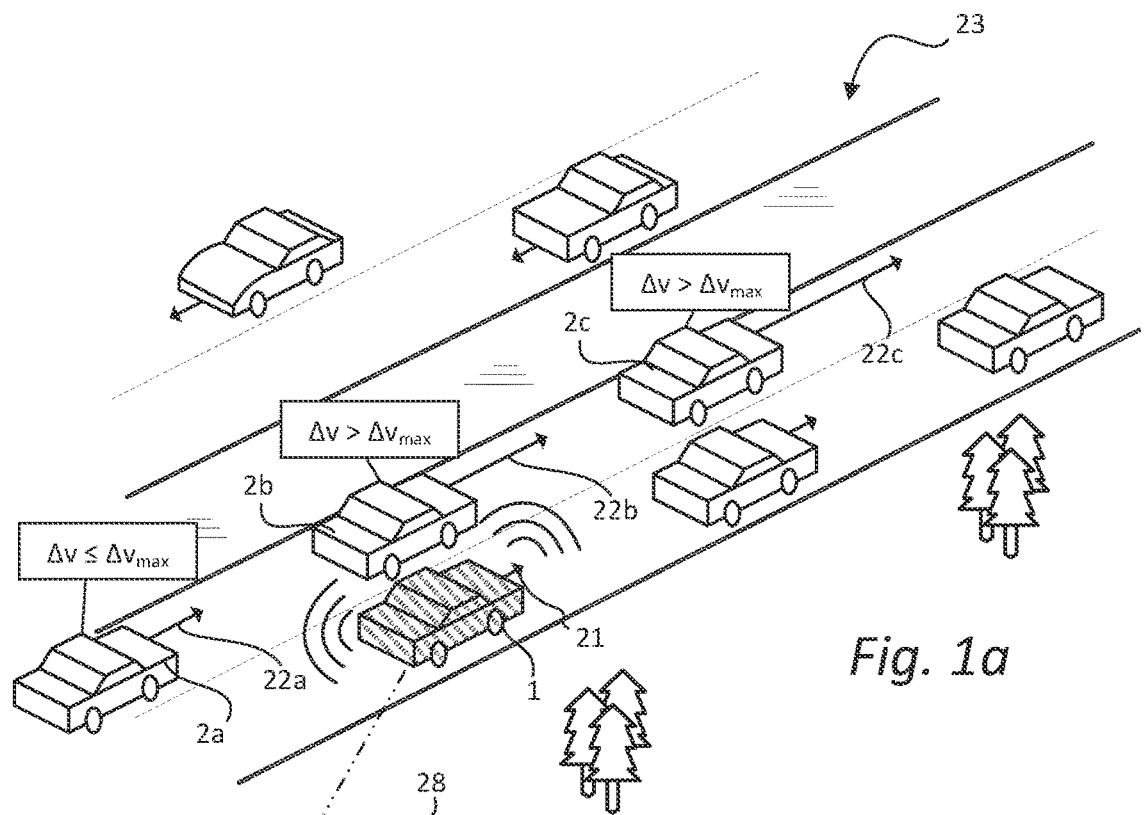
FIGS. 1a-1b are two schematic perspective view illustrations of a vehicle comprising a control system in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1B:
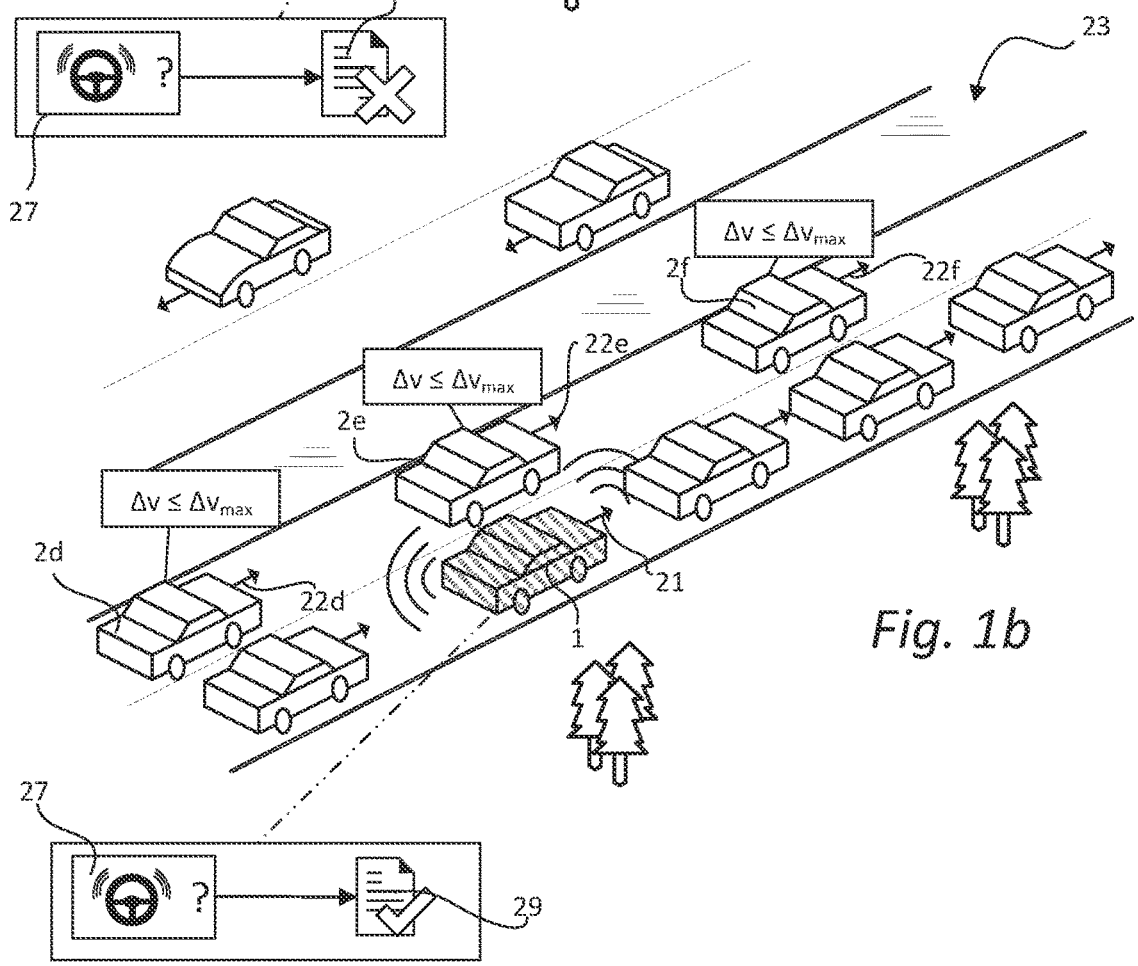

FIG. 1a and FIG. 1b are two schematic perspective view illustrations of a vehicle 1 (may also be referred to as ego-vehicle 1) comprising a control system in accordance with an embodiment of the present disclosure. More specifically, FIGS. 1a-1b aim to elucidate an example of how the control system operates in two different scenarios while the vehicle 1 is traveling on a road segment 23. The vehicle 1 is provided with a driver support function, which in the present context may be understood as an Autonomous Driving (AD) feature or an Automated Driving System (ADS) feature, and in reference to the latter it is preferably an ADS feature of level 3 or higher according to SAE J3016 levels of driving automation. The driver support function may for example be a "traffic jam pilot" feature, i.e. an autonomous driving feature configured to manoeuvre the vehicle 1 in a traffic-jam situation.

The present inventors noted that even if an autonomous or semi-autonomous vehicle 1 is traveling on a "highway-like" road, it doesn't necessarily imply that the relative velocity ($\Delta v$) of other vehicles traveling in adjacent lane is low. Relative velocity is in the present context to be understood as a magnitude of the difference in speed between the ego-vehicle and other vehicles 2a-f traveling in an adjacent lane. For example, if the ego-vehicle 1 is traveling at 60 km/h in a first direction and an external vehicle is traveling at 80 km/h in the same direction in an adjacent lane the relative velocity is 20 km/h. Similarly, if the ego-vehicle 1 is traveling at 60 km/h in a first direction and an external vehicle is traveling at 60 km/h in an opposite direction in an adjacent lane, the relative velocity is 120 km/h.

Moreover, if it cannot be proven or even assumed that high relative velocities are a "rare event" while the ego-vehicle is traveling, it must be assumed that the exposure to high relative velocities is high in order to be able to ensure that the ego-vehicle 1 is operating safely to a sufficiently high degree. However, high exposure to high relative velocities results in high reliability/integrity requirements (e.g. ASIL D) on the driver support function's ability to stay within its own lane (ego-lane), which in turn will result in high reliability/integrity requirements on the corresponding sensors. These reliability/integrity requirements translate to immense verification requirements (verification of the driver support function) and use of high-end sensor devices and systems, which add significant costs in a very cost sensitive automotive industry.

It was then realized that instead of focusing on the driver support function and in particular its ability to stay in lane (which is a very costly and time consuming feature to develop and verify), one should instead focus on the risk exposure in order to reduce the overall risk assessment for collisions. In more detail, by moving the high integrity requirements to the monitoring of the relative velocities in the adjacent lane(s), the risk exposure can be controlled to be at a sufficiently low level such that the requirements on the driver support function's ability to stay in its own lane can be relaxed by a corresponding amount.

Further, in the context of an Automotive Safety Integrity Level (ASIL) classification, there are three classification categories (Severity classification (S), Exposure classification (E), and Controllability classification (C)), which may be used when determining an ASIL requirement for a driver support feature. It should be noted that even though the following discussion is made in reference to ASIL classification, the disclosure is not limited thereto since the same logical reasoning can be applied to any other current or future risk classification scheme used in the context of specifying safety requirements of autonomous and semi-autonomous driving features for vehicles. Thus, the discussions related to the ASIL-levels and the corresponding classification categories (S, E, and C) are to be understood as examples serving to elucidate at least some advantages of the embodiments disclosed herein.

Thus, in a conventional case for driver support feature in the form of a traffic jam pilot, there is a high exposure level (E4) to oncoming traffic since the monitoring of relative velocities of vehicles in adjacent lanes is not prioritized and it must therefore be assumed that there high exposure to high relative velocities. Moreover, severity level is obviously high (S3) since the severity of the injuries caused by a hazardous event (collision with a vehicle traveling at a high relative speed) are life-threatening to fatal, and it is difficult for a driver to prevent the injury wherefore the controllability is low (C3), i.e. the driver cannot do much to prevent the injury once a hazardous event occurs. Accordingly, the ASIL for the driver support features ability to stay within its own lane should be set to ASIL D, i.e. the vehicle system should not fail to stay within the lane more than once per $10^9$ hours of driving. Thus, in many cases the task of developing and offering autonomous driving features becomes an unfeasible task due to the immense requirements and costs associated thereto.

Therefore, by shifting the focus to the exposure levels, and more specifically shifting the high ASIL requirements to the monitoring (design time or run time) of the surrounding environment of the vehicle the ASIL requirement on the driver support feature's ability to stay in lane can be relaxed. In more detail, it was realized that it far less complicated to monitor the relative velocities of vehicles traveling in adjacent lanes than to ensure that the vehicle is able to stay within its own lane at all times. Thus, by determining when the vehicle is and is not within a "high risk environment" (i.e. exposed to high relative velocities), and ensuring that the driver support feature is only available (for activation) when the vehicle is not within such a "high risk environment", the exposure of a hazard can be kept at a low level (E2), and the requirement for the driver support feature to stay within its lane can be relaxed (e.g. to ASIL B). An additional criteria to keep the exposure at a low level may be to ensure that the driver support feature transitions to a DDT (Dynamic Driving Task) Fall-back when entering a so-called "high risk environment".

Accordingly, it can be said that in the conventional case the requirement for the driver support feature to keep the vehicle in its own lane was at ASIL D because a hazardous event (collision with vehicles moving at high relative velocities) may be associated with high severity (S3), high exposure (E4), and low controllability (C3). By focusing the feature to only be available in environments fulfilling certain criteria (low relative velocities) the residual risk is split up into two cases, collision with vehicle in adjacent lane at low relative velocity and collision with vehicle at high relative velocity. Collision with vehicle at low relative velocity may be associated with low severity (S1), high exposure (E4), and low controllability (C3) which translates into an ASIL B requirement for staying within lane. Collision with vehicles at high relative velocity may now instead be associated with high severity (S3), low exposure (E2), and low controllability (C3) which translates into an ASIL B requirement for staying within lane. Naturally, these classification categories may be estimated or judged in other ways depending on e.g. specific scenarios, type of vehicle, geographical location, and so forth. However, the general concept and conclusions are analogously applicable.

Moving on, in FIG. 1a the vehicle 1 is traveling in a first direction 21 on a road segment 23, here in the form of a controlled-access highway (may also be referred to as a motorway, freeway or expressway). More specifically, the controlled-access highway is a dual carriage way where each carriage way having two lanes, and the road segment 23 is a portion of one of the carriage ways. The dual carriage way can be understood as a class of highway with two carriageways for traffic travelling in opposite directions separated by a median strip (may also be referred to as a central reservation).

The driver support function of the vehicle 1 is capable of operating within a specific Operating Design Domain (ODD). An Operational design domain (ODD) is to be understood as a description of the operating domains in which an automated or a semi-automated driving system (i.e. ADS or ADAS) is designed to function, including, but not limited to, geographic, roadway (e.g. type, surface, geometry, edges and markings), environmental, connectivity, surrounding objects, and speed limitations. Thus, the ODD of the driver support function defines a set of requirements that must be fulfilled if the driver support function is to be able to operate.

In some embodiments the ODD includes a relative velocity metric that is to be fulfilled if the driver support function 29 is to be able to operate within the ODD. In more detail, the relative velocity metric may in the present context be understood as a set of parameters related to relative velocities (relative difference in speeds between the ego-vehicle 1 and surrounding vehicles 2a-2c) which are to be within predefined ranges in order to achieve ODD fulfilment. For example, the set of parameters may comprise maximum threshold for a velocity difference between the ego-vehicle 1 and "external" vehicles 2a-2c traveling in a second lane adjacent to the ego-lane (i.e. current lane of the ego-vehicle 1). Moreover, the set of parameters may further contain a time-aspect, i.e. that at least one external vehicle 2a-2c traveling in an adjacent lane having a relative velocity below the maximum velocity threshold must have been detected during a time period (e.g. during the last 60 seconds of operation). The maximum velocity threshold may for example be in the range of 20 km/h-80 km/h or in the range of 40 km/h-80 km/h, such as e.g. 60 km/h.

The vehicle 1 has a control system comprising control circuitry that is configured to obtain sensor data (e.g. from a perception system of the vehicle 1). Further, the control circuitry is configured to determine or obtain a relative velocity of the external vehicles 2a-2c traveling in the adjacent lane with respect to the ego-vehicle 1, based on the sensor data. "Determine or obtain" is intended to illustrate that the control circuitry may either derive the relative velocities by itself based on raw sensor data or obtain the relative velocities directly from the perception system depending on how the vehicle platform and peripherals are designed.

The relative velocities may for example be derived by obtaining a velocity of the ego-vehicle 1, determining a velocity (indicated by the arrows 22a-22c) of the external vehicles 2a-2c, and determining a difference between the determined velocity of the external vehicles 2a-2c and the obtained velocity of the ego-vehicle 1, the difference defining the relative velocity of the external vehicles 2a-2c. For example, if the ego-vehicle 1 is traveling at a speed of 20 km/h in a first direction 21, and an external vehicle 22a is traveling at a speed of 80 km/h in a direction parallel to the first direction, the relative velocity $\Delta v$ is 60 km/h ($\Delta v=|80-20|=60$).

Further, the control circuitry is configured to compare the determined relative velocities with a maximum velocity threshold $\Delta v_{max}$. In other words, the control circuitry is configured to confirm/verify whether or not the external vehicles 2a-2c have relative velocities $\Delta v$ that are below the maximum velocity threshold $\Delta v_{max}$. Moreover, the control circuitry is configured to generate a control signal in order to control an availability 28, 29 of the driver support function for the road segment based on the comparison. More specifically, the control circuitry is configured to make the driver support function for an occupant of the vehicle if the following two conditions are fulfilled:

At least one external vehicle 2a-2c of the plurality of external vehicles 2a-2c has been confirmed to have a relative velocity $\Delta v$ below the maximum velocity threshold $\Delta v_{max}$ during a first time period.

No external vehicle 2a-2c of the plurality of external vehicles 2a-2c has been confirmed to have a relative velocity $\Delta v$ above the maximum velocity threshold $\Delta v_{max}$ during a second time period.

Stated differently, the control circuitry must confirm that at least one external vehicle 2a-2c has been observed to have a relative velocity $\Delta v$ below the maximum velocity threshold $\Delta v_{max}$ during the first time period (e.g. during the last or most recent 60 seconds), and that no external vehicle 2a-2c has been observed to have a relative velocity $\Delta v$ above the maximum velocity threshold $\Delta v_{max}$ during the second time period (e.g. during the last or most recent 90 seconds). Thus, the control system performs a check to see whether or not the ego-vehicle 1 has passed or been passed by a vehicle 2a-2c, during the last 60 seconds of operation, which had a relative velocity $\Delta v$ below the maximum velocity threshold $\Delta v_{max}$ and if the ego-vehicle 1 has passed or been passed by a vehicle 2a-2c, during the last 30 seconds of operation, which had a relative velocity $\Delta v$ above the maximum velocity threshold $\Delta v_{max}$. If any of these checks "fail", the driver support function is made unavailable for the occupant of the vehicle 1.

By introducing the first and second time periods a type of "dead reckoning filter" and "cool-off period" is incorporated and the overall safety of the system is improved and availability is increased according to the following reasoning.

The first time period provides the "dead reckoning filter" feature by adding a type of "expiration date" to the relative velocity measurements and thereby ensuring that the system is operating on relevant data. In more detail, the first time period aids to ensure that too long time hasn't passed since a "low relative velocity" was confirmed, and a risk of the driver support function operating in an environment outside of its ODD due to sensor malfunction or software bugs can be reduced. For example, in a scenario where the sensors would stop detecting any relative velocities (sensor malfunction), without the first time period there is a risk that the driver support function is allowed to operate in an environment that isn't safe (several vehicles in adjacent lane having a relative velocity above the threshold). Stated differently, if the vehicle 1 is in a situation where no reports of relative velocities of vehicles in adjacent lanes is obtained, then it cannot be relied upon that the vehicle 1 is in a "safe environment" with low velocities, and the driver support function is made unavailable until it can be known for certain that the relative velocities are below the threshold.

The second time period provides the "cool-off period" for detections of maximum velocity violations. In more detail, without the second time period one would have to make some type of averaging function of the measurement data and set a threshold defining a percentage of maximum velocity threshold violations that is allowable (e.g. <1%). In such a solution, if the ego-vehicle determines that the first external vehicle is a speeding vehicle (relative velocity above threshold), then the ego-vehicle user would either have to wait until 99 other vehicles are confirmed to have a relative velocity below the threshold or wait until a sufficiently long measurement time has passed without further violations in order to be able to use the driver support function. Thus, even if the "speeding vehicle" is a rare event, if it occurred at an "inconvenient" time, it will drastically affect the availability of the driver support function.

In the illustrated example of FIG. 1a, the ego-vehicle has been passed (e.g. within the last 10 seconds) by an external vehicle 2c whose relative velocity $\Delta v$ was above the maximum velocity threshold $\Delta v_{max}$, and is being passed by an external vehicle 2b whose relative velocity also is above the maximum velocity threshold $\Delta v_{max}$. Moreover, a third external vehicle 2a whose relative velocity $\Delta v$ is below the maximum velocity threshold is detected in the adjacent lane. Accordingly, even though one of the criteria for making the driver support function available is fulfilled, there has been two external vehicles with a relative velocity $\Delta v$ above the threshold $\Delta v_{max}$ during the second time period, wherefore the driver support function 27 is made unavailable 28.

In FIG. 1ab, the ego-vehicle has been passed (e.g. within the last 10 seconds) by a first external vehicle 2f whose relative velocity $\Delta v$ was below the maximum velocity threshold $\Delta v_{max}$, and is being passed by a second external vehicle whose relative velocity $\Delta v$ is below the maximum velocity threshold $\Delta v_{max}$. Moreover, a third external vehicle 2d whose relative velocity $\Delta v$ is also below the maximum velocity threshold $\Delta v_{max}$. Thus, both of the conditions are satisfied in this scenario, and the driver support function 27 is made available 29.

Figure 2:
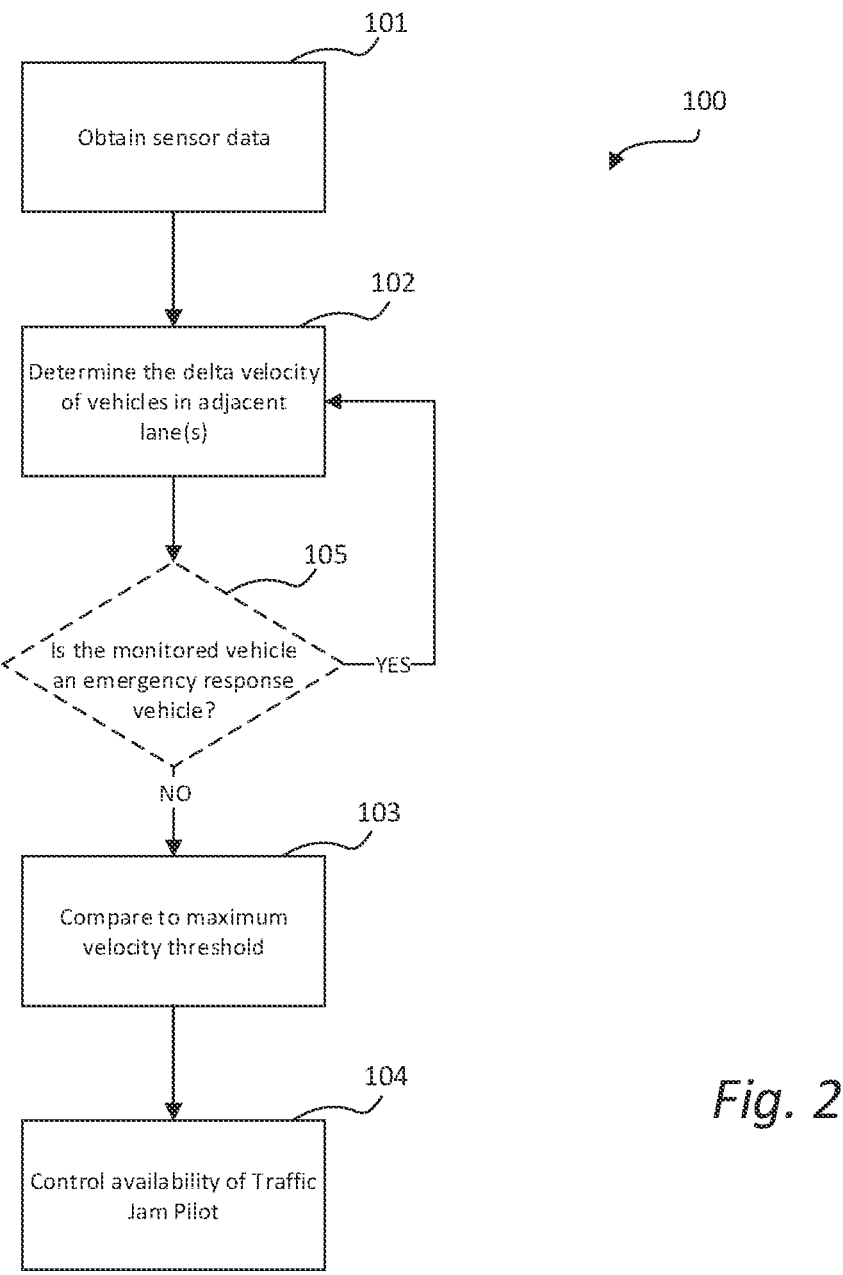
FIG. 2 is a schematic flow chart representation of a method for controlling a driver support function for autonomously manoeuvring a vehicle in accordance with an embodiment of the present disclosure.

FIG. 2 is a schematic flow chart representation of a method 100 for controlling a driver support function for autonomously manoeuvring a vehicle traveling in a first direction on a road segment. The method comprises obtaining 101 sensor data comprising information about a surrounding environment of the vehicle. The sensor data may for example be obtained from the vehicle's perception system comprising one or more sensor devices arranged to monitor the surrounding environment. The term obtaining is herein to be interpreted broadly and encompasses receiving, retrieving, collecting, acquiring, and so forth.

The method 100 further comprises determining 102 a relative velocity $\Delta v$ of each vehicle traveling in a second lane adjacent to the ego-lane based on the obtained 101 sensor data. Naturally, the step of determining a relative velocity $\Delta v$ of external vehicles, comprises determining a relative velocity $\Delta v$ of vehicles located sufficiently close to the ego-vehicle to be detected and measured upon by the ego-vehicle's sensors as readily understood by the skilled reader. In some embodiments, the relative velocity, with respect to the ego-vehicle, is determined by obtaining a velocity of the ego-vehicle, determining a velocity of an external vehicle, and determining a difference between the determined velocity of the external vehicle and the obtained velocity of the ego-vehicle. The difference accordingly defining the relative velocity, with respect to the ego-vehicle, of the external vehicle.

Further, the method 100 may comprise a step of determining 105 whether or not the monitored/detected external vehicle is an emergency vehicle (e.g. law enforcement, ambulance, fire truck) having one or more active warning devices (e.g. flashing lights and sirens). Further, if the monitored/detected external vehicle is an emergency vehicle (that is responding to an emergency), then any determined relative velocity of the emergency vehicle having one or more active warning devices is disregarded for the purpose of controlling the availability of the driver support function. This is advantageous in situations when the ego-vehicle is controlled by a traffic jam pilot in a traffic jam and gets passed by an ambulance rushing through the traffic jam in order to for example reach the cause of the traffic jam. Accordingly, by having disregarding the relative velocity of the emergency response vehicle, the traffic jam pilot is not unnecessarily interrupted and user satisfaction is improved.

Further, the method 100 comprises comparing 103 the detected relative velocity $\Delta v$ with a maximum velocity threshold $\Delta v_{max}$, and controlling 104 an availability of the driver support function for the road segment based on the comparison in order to make the driver support function available for an occupant of the vehicle if the following two criteria are met:

At least one external vehicle has been confirmed to have a relative velocity $\Delta v$ below the maximum velocity threshold $\Delta v_{max}$ during a first time period.

No external vehicle has been confirmed to have a relative velocity $\Delta v$ above the maximum velocity threshold $\Delta v_{max}$ during a second time period.

The step of comparing 103 the detected velocity with a maximum velocity threshold may further comprise confirming whether or not each external vehicle has a relative velocity below the maximum velocity threshold. Furthermore, the step of controlling 104 the availability of the driver support function may comprise controlling the availability of the driver support function for the road segment based on the comparison in order to maintain the driver support function as available for the occupant of the vehicle until one of the following occurs:

Zero external vehicles has been confirmed to have a relative below the maximum velocity threshold during the first time period.

One external vehicle has been confirmed to have a relative velocity above the maximum velocity threshold.

In other words, the driver support function is available until no detections of external vehicles having a relative velocity $\Delta v$ below the threshold is made during the last e.g. 60 seconds, or until one detection of a speeding vehicle (i.e. having a $\Delta v$ above the threshold) is made.

Executable instructions for performing these functions are, optionally, included in a non-transitory computer-readable storage medium or other computer program product configured for execution by one or more processors.

FIGS. 3a-3d are schematic charts illustrating relative velocity measurements in four different scenarios, and the following discussion will be in reference to the availability state of the driver support feature (i.e. if it is available or unavailable for an occupant of the vehicle) at time t0. Moreover, in the following discussion related to FIGS. 3a-3b, the first time period and the second time period are considered to be the same and extend between −t1 and t0, i.e. [−t1, t0], and may for example correspond to the last 60 seconds wherefore −t1 may be −60 seconds.

Figure 3A:
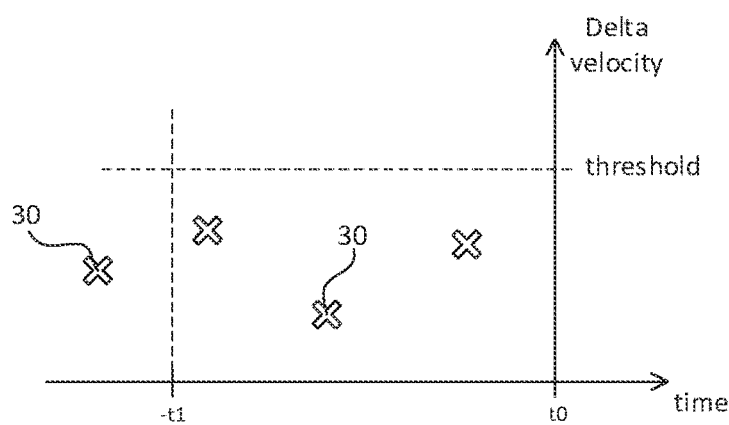
FIGS. 3a-3d are a set of schematic charts illustrating a method for controlling a driver support function for autonomously manoeuvring a vehicle in accordance with an embodiment of the present disclosure.

In FIG. 3a, four different velocity measurements have been made on four different external vehicles over a measurement period. The determined relative velocities 30 for the four different external vehicles are all below the maximum velocity threshold, and three of them occurred during the first time period, wherefore the driver support function is available for an occupant of the vehicle at time t0. The "occurrence" may for example be defined by a time stamp defined by the moment in time when the external vehicle passes or is passed by the ego-vehicle. However, in some embodiments each external vehicle may be "tracked" by the ego-vehicle as long as the external vehicle is within the measurement range of the ego-vehicle's sensor devices. Thus, in those embodiments, the measurements may instead comprise several measurements points over time, where the interval between the measurements points is for defined by a sample rate (e.g. 10 ms, 50 ms, or 100 ms). Accordingly, instead of the data points illustrated in FIGS. 3a-3d, the "relative velocity" data points may be in the form of curves extending between two points in time (X-axis).

Figure 3B:
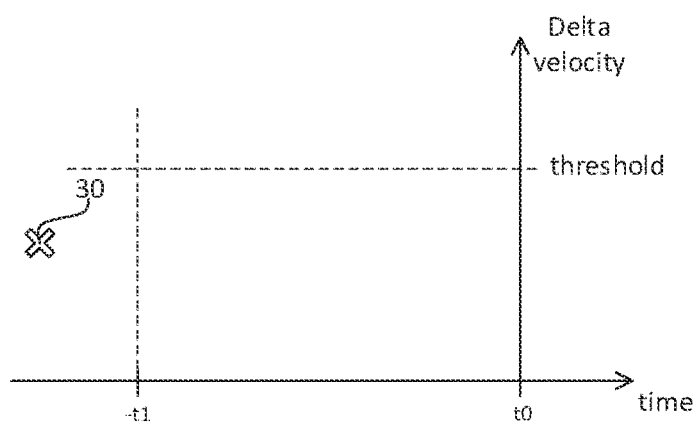

In FIG. 3b, no external vehicle has been confirmed to have a relative velocity 30 below the maximum velocity threshold during the first time period [−t1, t0]. Thus, the driver support feature is unavailable for the occupant of the vehicle.

Figure 3C:
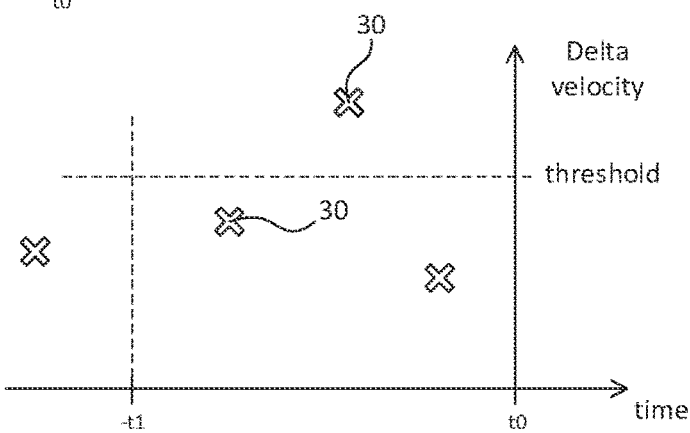

In FIG. 3c, one external vehicle of the external vehicles has been confirmed to have a velocity above the maximum velocity threshold during the second time period [−t1, t0]. Thus, the driver support feature is unavailable for the occupant of the vehicle, even though two external vehicles have been confirmed to have a relative velocity below the maximum velocity threshold during the first time period [−t1, t0], the driver support function is unavailable for the occupant of the vehicle.

Figure 3D:
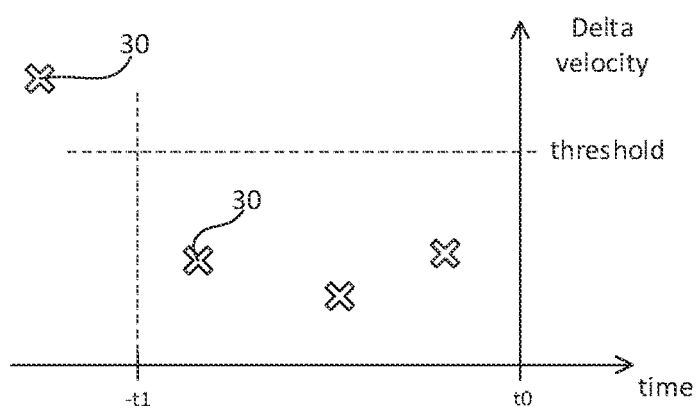

In FIG. 3d, three external vehicles have been confirmed to have a relative velocity below the maximum velocity threshold during the first time period [−t1, t0]. Moreover, one external vehicle has been confirmed to have a relative velocity above the maximum velocity threshold. However, this confirmation occurred outside of the second period [−t1, t0], i.e. that external vehicle passed or was passed by the ego-vehicle earlier than the last 60 seconds. Thus, the driver support feature is made available for the occupant of the vehicle.

Figure 4:
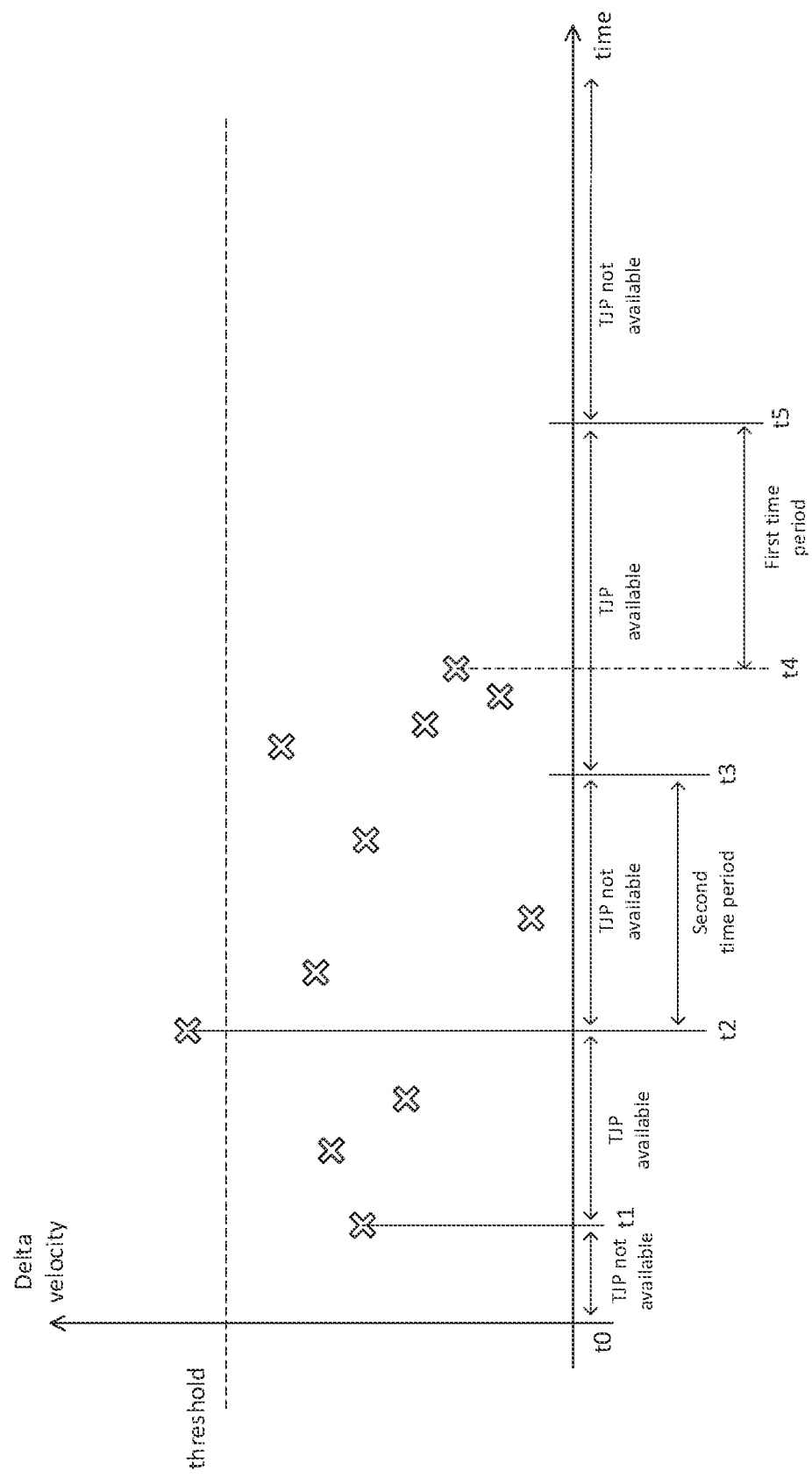
FIG. 4 is a schematic chart illustrating a method for controlling a driver support function for autonomously manoeuvring a vehicle in accordance with an embodiment of the present disclosure.

FIG. 4 is a schematic chart illustrating relative velocity measurements over time for an ego-vehicle traveling in a first direction in a first lane on a road segment. The vehicle has a driver support function in the form of a traffic jam pilot (TJP), i.e. an autonomous driving feature configured to manoeuvre the vehicle while the vehicle is in a traffic situation defined as a "traffic jam" based on a set of predetermined parameters or metrics.

In the illustrated example of FIG. 4 it is assumed that the measurements and the control system for controlling the availability of the TJP are initiated at time t0. Since there are no confirmations of external vehicles having a relative velocity below the maximum velocity threshold, the TJP function is not available for the occupant of the vehicle. However, at time t0, the ego-vehicle passes or is passed by an external vehicle having a relative velocity below the maximum velocity threshold, and the TJP function is made available from time t1 for an occupant of the vehicle. Here, as an illustrative example it can be assumed that the vehicle reaches a traffic jam situation. In some embodiments, the driver support feature is activated once it is available, and deactivated once it is unavailable. In the latter scenario, the control system may initiate a hand-over to a driver of the vehicle by generating a message via a Human Machine Interface (HMI) of the vehicle.

Moving on, two additional external vehicles are confirmed to have a relative velocity below the maximum velocity threshold. However, at time t2, the ego-vehicle passes or is passed by an external vehicle having a relative velocity above the maximum velocity threshold, and the TJP function is made unavailable from time t2. The TJP function will be unavailable for a duration of the second time period and made available after the end of the second time period [t2, t3] (e.g. the last 40 seconds) assuming that the following conditions are met:

At least one external vehicle has been confirmed to have a relative velocity $\Delta v$ below the maximum velocity threshold $\Delta v_{max}$ during a first time period.

No additional external vehicles have been confirmed to have a relative velocity $\Delta v$ above the maximum velocity threshold $\Delta v_{max}$ during this second time period.

Thus, the second time period can be understood as a "cool off period" from which the last confirmation of an external vehicle having a relative velocity above the maximum velocity threshold was made. Once this "cool off period" has expired and no further violations above the maximum velocity threshold has been made, the second criteria above is fulfilled. Moving on, three additional external vehicles were confirmed to have a relative velocity below the maximum velocity threshold during the second time period [t2, t3] and the TJP function is made available for an occupant of the vehicle at time t3.

Further, at time t4 the last confirmation of an external vehicle having a relative velocity below the maximum velocity threshold is made. Thus, assuming that the first time period is of a length from t4 to t5 (e.g. 60 seconds), at time t5 the condition of having at least one external vehicle confirmed to have a relative velocity $\Delta v$ below the maximum velocity threshold $\Delta v max$ during a first time period is no longer met. Accordingly, at time t5 the TJP function is made unavailable for an occupant of the vehicle.

Figure 5:
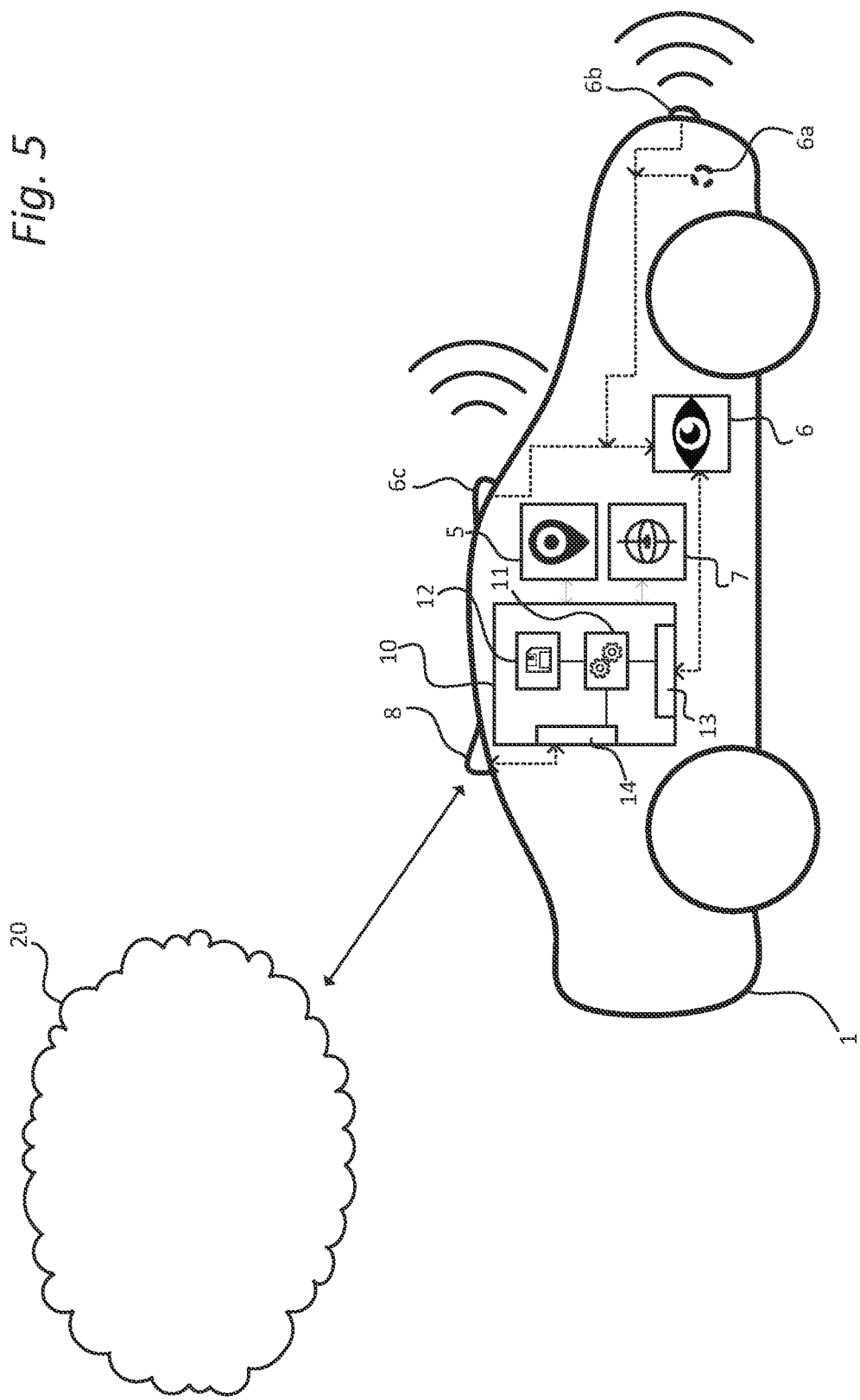
FIG. 5 is a schematic side view illustration of a vehicle comprising a control system in accordance with an embodiment of the present disclosure.

FIG. 5 is a schematic side view of a vehicle 1 comprising a control system 10 for a vehicle 1. The vehicle 1 has a driver support function for autonomously manoeuvring the vehicle 1. The vehicle 1 further comprises a perception system 6, an inertial measurement unit (IMU) 7, and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively realized as a Real Time Kinematics (RTK) GPS in order to improve accuracy. An IMU 7 is to be understood as an electronic device configured to measure the inertial movement of the vehicle 1. An IMU 7 usually has six degrees of freedom, three accelerometers and three gyroscopes. Each of the localization system 5, and the IMU 7 may serve as a velocity determining device for monitoring a velocity of the vehicle 1.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for controlling a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain sensor data from the perception system 6, one or both of the localization system 5 and the IMU 7. The sensor data comprises information about a surrounding environment of the vehicle and a velocity of the ego-vehicle 1. The control circuitry 11 is further configured to determine a relative velocity, with respect to the ego-vehicle, of at least one external vehicle traveling in an adjacent lane a based on the obtained sensor data, and to compare the determined relative velocity to a maximum velocity threshold. Further the control circuitry 11 is configured to generate a control signal in order to control an availability of the driver support function based on the comparison in order to make the driver support function available for an occupant of the vehicle if the following criteria are met:

At least one external vehicle has been confirmed to have a relative velocity $\Delta v$ below the maximum velocity threshold $\Delta v_{max}$ during a first time period.

No additional external vehicles have been confirmed to have a relative velocity $\Delta v$ above the maximum velocity threshold $\Delta v_{max}$ during this second time period.

In some embodiments, the driver support function may be automatically activated by the control circuitry if it is available and deactivated if it is unavailable. An active driver support function is arranged to generate control signals for a control system of the vehicle in order to control at least one of a steering angle of the vehicle 1, an acceleration of the vehicle 1, and a deceleration of the vehicle 1 (i.e. control the brakes).

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as Wi-Fi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the predefined maximum velocity threshold. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A control system for an ego-vehicle traveling in a first direction in a first lane on a road segment, wherein the ego-vehicle has a driver support function for autonomously manoeuvring the ego-vehicle, the control system comprising control circuitry configured to:

obtain sensor data comprising information about a surrounding environment of the ego-vehicle;
determine a relative velocity, with respect to the ego-vehicle, of at least one external vehicle of a plurality of external vehicles traveling in a second lane adjacent to the first lane based on the obtained sensor data;
compare the determined relative velocity to a maximum velocity threshold; and
generate a control signal to control an availability of the driver support function for the road segment based on the comparison to make the driver support function available for an occupant of the ego-vehicle when:
at least one external vehicle has been confirmed to have a relative velocity below the maximum velocity threshold during a first time period; and
no external vehicle has been confirmed to have a relative velocity above the maximum velocity threshold during a second time period,
wherein the first time period comprises a defined first time period and the second time period comprises a second defined time period, and wherein the first and second time period occur over a same time interval.

2. The control system according to claim 1, wherein the driver support function is available for the occupant of the ego-vehicle, and wherein the control circuitry is configured to:
generate the control signal to control the availability of the driver support function for the road segment based on the comparison to maintain the driver support function as available-for the occupant of the ego-vehicle until:
no external vehicle has been confirmed to have a relative velocity below the maximum velocity threshold during the first time period; or
the at least one external vehicle has been confirmed to have a relative velocity above the maximum velocity threshold.

3. The control system according to claim 1, wherein the driver support function is a traffic jam pilot function.

4. The control system according to claim 1, wherein the maximum velocity threshold is in a range of 40 km/h to 80 km/h.

5. The control system according to claim 1, wherein the control circuitry is further configured to:
determine whether or not the at least one external vehicle is an emergency vehicle having one or more active warning devices; and
disregard a determined relative velocity of any emergency vehicle having one or more active warning devices when comparing the relative velocity with a maximum velocity threshold.

6. The control system according to claim 1, wherein the control circuitry is further configured to determine the relative velocity, with respect to the ego-vehicle, of the at least one external vehicle by:
obtaining a velocity of the ego-vehicle;
determining a velocity of the at least one external vehicle; and
determining a difference between the determined velocity of the at least one external vehicle and the obtained velocity of the ego-vehicle, the difference defining the relative velocity, with respect to the ego-vehicle, of the at least one external vehicle.

7. The control system according to claim 1, wherein the first time period is a last 60 seconds, and the second time period is the last 60 seconds.

8. The control system according to claim 1, wherein the first and second time period are based on whether or not the external vehicle has a relative velocity above a maximum velocity.

9. A vehicle comprising:
a device for monitoring velocity of the vehicle;
a perception system comprising at least one sensor for monitoring a surrounding environment of the vehicle;
a control system for an ego-vehicle traveling in a first direction in a first lane on a road segment, wherein the ego-vehicle has a driver support function for autonomously manoeuvring the ego-vehicle, the control system comprising control circuitry configured to:
obtain sensor data comprising information about a surrounding environment of the ego-vehicle;
determine a relative velocity, with respect to the ego-vehicle, of at least one external vehicle of a plurality of external vehicles traveling in a second lane adjacent to the first lane based on the obtained sensor data;
compare the determined relative velocity to a maximum velocity threshold; and
generate a control signal to control an availability of the driver support function for the road segment based on the comparison to make the driver support function available for an occupant of the ego-vehicle when:
at least one external vehicle has been confirmed to have a relative velocity below the maximum velocity threshold during a first time period; and
no external vehicle has been confirmed to have a relative velocity above the maximum velocity threshold during a second time period,
wherein the first time period comprises a defined first time period and the second time period comprises a second defined time period, and wherein the first and second time period occur over a same time interval.

10. A method for controlling a driver support function for autonomously manoeuvring a vehicle traveling in a first direction on a road segment, the method comprising:
obtaining sensor data comprising information about a surrounding environment of the vehicle;
determining a relative velocity, with respect to the vehicle, of at least one external vehicle of a plurality of external vehicles traveling in a second lane adjacent to the first lane based on the obtained sensor data;
comparing the relative velocity with a maximum velocity threshold; and
controlling an availability of the driver support function for the road segment based on the comparison to make the driver support function available for an occupant of the vehicle when:
at least one external vehicle has been confirmed to have a relative velocity below the maximum velocity threshold during a first time period; and
no external vehicle has been confirmed to have a relative velocity above the maximum velocity threshold during a second time period,
wherein the first time period comprises a defined first time period and the second time period comprises a second defined time period, and wherein the first and second time period occur over a same time interval.

11. The method according to claim 10, wherein the driver support function is available for the occupant of the vehicle, wherein the step of controlling the availability of the driver support function further comprises:

controlling the availability of the driver support function for the road segment based on the comparison to maintain the driver support function as available for the occupant of the vehicle until:
  no external vehicle has been confirmed to have a relative below the maximum velocity threshold during a first time period; or
  the at least one external vehicle has been confirmed to have a relative velocity above the maximum velocity threshold.

12. The method according to claim 10, wherein the driver support function is a traffic jam pilot function.

13. The method according to claim 10, wherein the maximum velocity threshold is in a range of 40 km/h to 80 km/h.

14. The method according to claim 10, further comprising:
  determining whether or not the at least one external vehicle is an emergency vehicle having one or more active warning devices; and
  disregarding a determined relative velocity of any emergency vehicle having one or more active warning devices when comparing the relative velocity with a maximum velocity threshold.

15. A non-transitory computer-readable storage medium storing one or more instructions which, when executed by one or more processors of a vehicle control system, the one or more instructions for performing a method for controlling a driver support function for autonomously manoeuvring a vehicle traveling in a first direction on a road segment, the method comprising:
  obtaining sensor data comprising information about a surrounding environment of the vehicle;
  determining a relative velocity, with respect to the vehicle, of at least one external vehicle of a plurality of external vehicles traveling in a second lane adjacent to the first lane based on the obtained sensor data;
  comparing the monitored relative velocity with a maximum velocity threshold; and
  controlling an availability of the driver support function for the road segment based on the comparison to make the driver support function available for an occupant of the vehicle when:
    at least one external vehicle has been confirmed to have a relative velocity below the maximum velocity threshold during a first time period; and
    no external vehicle has been confirmed to have a relative velocity above the maximum velocity threshold during a second time period,
    wherein the first time period comprises a defined first time period and the second time period comprises a second defined time period, and wherein the first and second time period occur over a same time interval.

* * * * *